US012731850B2

(12) United States Patent
Schafer et al.

(10) Patent No.: US 12,731,850 B2
(45) Date of Patent: Sep. 8, 2026

(54) BATTERY HOUSING FOR TRACTION BATTERY AND TRACTION BATTERY FOR MOTOR VEHICLE

(71) Applicants: KAUTEX TEXTRON GmbH & Co. KG, Bonn (DE); FORD GLOBAL TECHNOLOGIES, LLC, Dearborn, MI (US)

(72) Inventors: Guido Schafer, Bornheim (DE); Stefan Lenz, Bergisch Gladbach (DE); Felix Haas, Bonn (DE); Georg Enkirch, Salz (DE); Muhamed Mulalic, Cologne (DE); Marcel Kruger, Bonn (DE); Mohammadreza Eftekhari, Novi, MI (US); Patrick Daniel Maguire, Ann Arbor, MI (US); Kanchana Perumalla, Troy, MI (US)

(73) Assignees: KAUTEX TEXTRON GmbH & Co. KG, Bonn (DE); FORD GLOBAL TECHNOLOGIES, LLC, Dearborn, MI (US)

( * ) Notice: Subject to any disclaimer, the term of this patent is extended or adjusted under 35 U.S.C. 154(b) by 632 days.

(21) Appl. No.: 18/024,395

(22) PCT Filed: Sep. 2, 2020

(86) PCT No.: PCT/EP2020/074503

§ 371 (c)(1),
(2) Date: Mar. 2, 2023

(87) PCT Pub. No.: WO2022/048747

PCT Pub. Date: Mar. 10, 2022

(65) Prior Publication Data

US 2023/0369705 A1 Nov. 16, 2023

(51) Int. Cl.
*H01M 50/262* (2021.01)
*B60L 50/64* (2019.01)
*H01M 50/249* (2021.01)

(52) U.S. Cl.
CPC ........... *H01M 50/262* (2021.01); *B60L 50/64* (2019.02); *H01M 50/249* (2021.01); *H01M 2220/20* (2013.01)

(58) Field of Classification Search
None
See application file for complete search history.

(56) References Cited

U.S. PATENT DOCUMENTS 10,371,181 B1 8/2019 Reibling et al.
2010/0062325 A1 3/2010 Liu
(Continued)

FOREIGN PATENT DOCUMENTS

CN 101673813 A 3/2010
CN 201486664 5/2010
(Continued)

OTHER PUBLICATIONS

PCT International Preliminary Report on Patentability for corresponding PCT Application No. PCT/EP2020/074503 dated Mar. 7, 2023, 6 pages.
(Continued)

*Primary Examiner* — Wyatt P McConnell
(74) *Attorney, Agent, or Firm* — Lee & Hayes. P.C.

(57) ABSTRACT

A battery housing for a traction battery. The battery housing includes a first housing shell, and a second housing shell which can be connected to the first housing shell, for bounding an interior formed to receive at least one battery module. The first housing shell has a first collar which runs at least partially around the first housing shell. The second housing shell has a second collar which runs at least partially
(Continued)

Figure 1A:
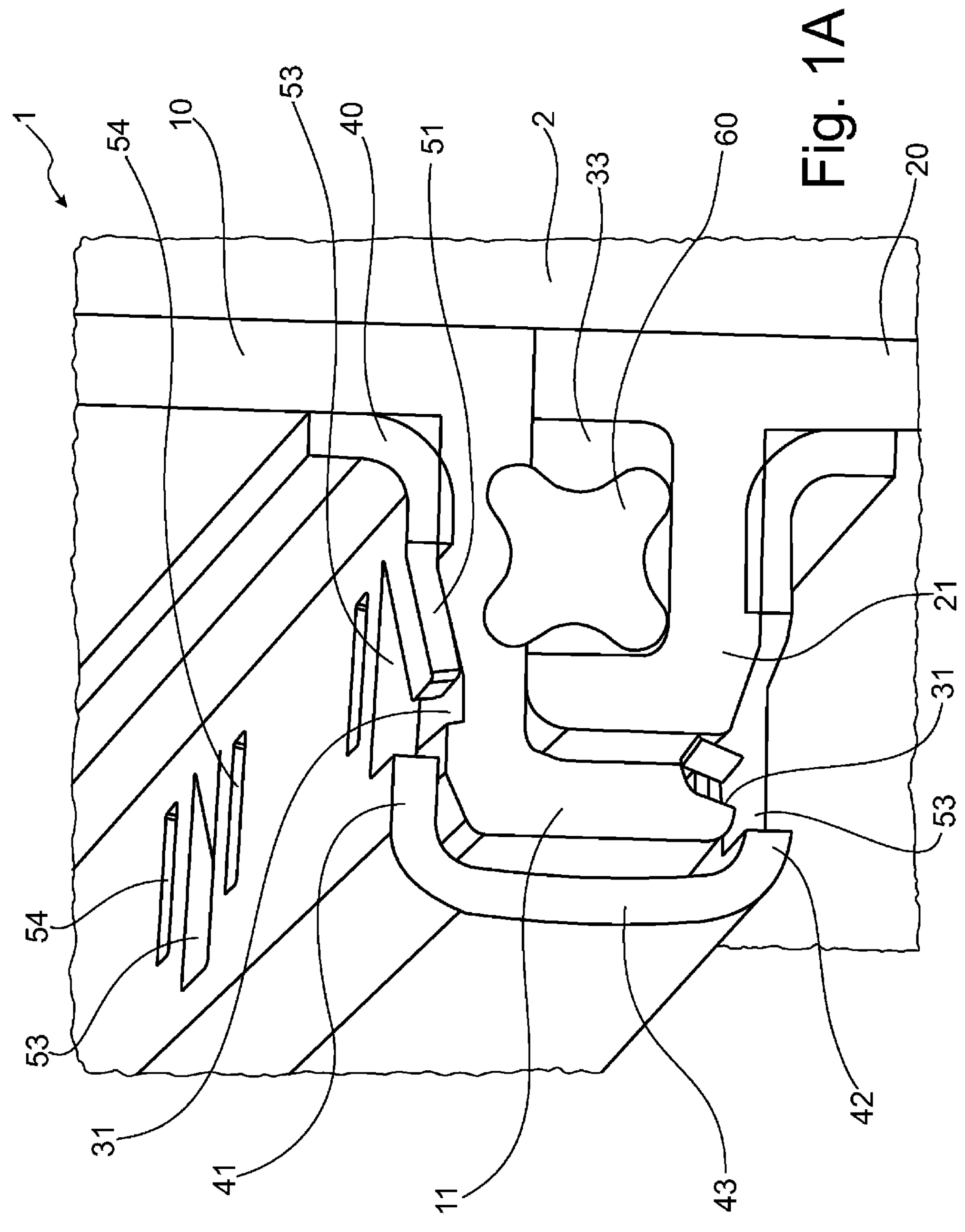

around the second housing shell. The battery housing has at least one connection element having two pressure limbs. The at least one connection element engages around the first collar and the second collar and to clamp by the two pressure limbs of the connection element exerting a normal force on the first collar and on the second collar. The first collar and/or the second collar has at least one first latching means. The connection element has at least one second latching means. The connection element can be latched to the first collar and/or the second collar by means of the first latching means and the second latching means.

9 Claims, 6 Drawing Sheets

(56) References Cited

U.S. PATENT DOCUMENTS

| | | | | |
|---|---|---|---|---|
| 2011/0159332 | A1* | 6/2011 | Dong | H01M 50/244<br>429/97 |
| 2014/0120413 | A1* | 5/2014 | Nielsen | H01M 50/191<br>429/185 |
| 2019/0312245 | A1* | 10/2019 | Schröder | H01M 50/249 |

FOREIGN PATENT DOCUMENTS

| | | | |
|---|---|---|---|
| CN | 102602269 | A | 7/2012 |
| CN | 204383262 | U | 6/2015 |
| CN | 205657105 | | 10/2016 |
| CN | 108119872 | A | 6/2018 |
| CN | 108206254 | A | 6/2018 |
| CN | 110350118 | A | 10/2019 |
| DE | 102016225662 | | 6/2018 |
| EP | 2479818 | | 7/2012 |
| EP | 2915201 | | 9/2015 |
| JP | 2008181733 | | 8/2008 |
| JP | 2010284984 | | 12/2010 |
| JP | 2013175490 | | 9/2013 |
| WO | WO2020038782 | | 2/2020 |

OTHER PUBLICATIONS

Japanese Notice of Reasons for Rejection for corresponding Japanese Application No. 2023514467 dated May 27, 2024, 14 pages.

Chinese Office Action for corresponding Chinese Patent Application No. 202080103617.X dated Jun. 13, 2025, 24 pages.

PCT Search Report for corresponding PCT Application No. PCT/EP2020/074503 dated May 20, 2021, 5 pages.

* cited by examiner 60
33
11
21
41
42
43
52
32
32
1

BATTERY HOUSING FOR TRACTION BATTERY AND TRACTION BATTERY FOR MOTOR VEHICLE

This Application claims priority to PCT Application No. PCT/EP2020/074503, filed Sep. 9, 2020, the contents of which is incorporated herein by reference.

The present invention relates to a battery housing for a traction battery for an electrically drivable motor vehicle, the battery housing having a first housing shell and a second housing shell which can be connected to the first housing shell for bounding an interior designed to receive at least one battery module.

Battery housings known from the prior art frequently have housing shells made of metal in the form of an upper shell and a lower shell, each having peripheral collars. Battery housings are also known of which the upper shell and lower shell are made of a plastics material. The housing shells are connected to one another by means of connecting screws by the two collars of the upper shell and the lower shell being connected to one another by means of the connecting screws.

For example, self-tapping screws can be used for the connecting screws. Furthermore, it is possible to insert threaded inserts into the collars of the housing shells. A disadvantage of corresponding designs is that the handling during assembly and/or servicing is very complex, since many components are used. Furthermore, when assembling a corresponding battery housing, the problem is that, for example, a screw can fall into the battery housing and/or be forgotten in the battery housing. In addition, in the case of a corresponding embodiment of the battery housing, there is a high demand on the accuracy of fit and on the position tolerances of the hole pattern of the upper housing shell relative to the lower housing shell. A further disadvantage of a correspondingly designed battery housing is that, in the event of faulty internal threads on the battery housing, a complicated reworking is necessary, as a result of which, for example, metal chips can again reach the interior of the battery housing, which is absolutely to be avoided in order to reduce a risk of short-circuit.

Ultimately, in the case of correspondingly designed battery housings, there is a problem of leaks of the battery housing. This is because, on account of stiffness demands on the flange system or the collars of the housing shells, a sealing element arranged between the housing shells or between the collars of the housing shells is not uniformly compressed, due to the strongly fluctuating preload, as a result of which the battery housing can have leaks. This is because, between the screw points of the battery housing, different preloads occur compared with in the immediate vicinity of the screw points.

The object of the present invention is to provide a battery housing for a traction battery which does not have the above-described disadvantages.

The object of the present invention is achieved by a battery housing having the features of claim 1. Advantageous embodiments of the battery housing are described in the claims dependent on claim 1.

More precisely, the object of the present invention is achieved by a battery housing for a traction battery, the battery housing having a first housing shell and a second housing shell which can be connected to the first housing shell for bounding an interior designed to receive at least one battery module. The first housing shell of the battery housing has a first collar which extends at least partially around the first housing shell, and the second housing shell of the battery housing has a second collar which extends at least partially around the second housing shell. The battery housing further comprises at least one connection element having two pressure limbs, the at least one connection element being designed to enclose the first collar and the second collar and to clamp these to one another by the two pressure limbs of the connection element exerting a normal force on the first collar and on the second collar. The battery housing according to the invention is characterized in that the first collar and/or the second collar has or have at least one first latching means, and in that the connection element has at least one second latching means, it being possible for the connection element to be latched to the first collar and/or the second collar by means of the first latching means and the second latching means.

The battery housing according to the invention has a plurality of advantages. Thus, the battery housing according to the invention has improved tightness, since the collars and a sealing element, which may be arranged between the collar, are uniformly clamped to one another over the entire longitudinal extension of the connection element, such that no pressure differences occur along the longitudinal extension of the collars.

Furthermore, the battery housing according to the invention is easy to assemble by the housing shells being placed on top of one another and subsequently the connection element being pushed over the collars of the housing shells and said collars being clamped to one another by means of the connection element. Due to the locking of the connection element to the first collar and/or the second collar, the connection element is prevented from being pulled off. However, it is possible, during maintenance work on the traction battery, to release the connection element from the two collars by deformation of the first latching means and/or by deformation of the second latching means, such that the battery housing can be opened easily for maintenance purposes.

A further advantage of the battery housing according to the invention is that the necessary positioning accuracy of the housing shells relative to one another can be reduced, as a result of which the assembly of the battery housing is possible in a further simplified manner.

Furthermore, the battery housing according to the invention has the advantage that no screw and/or no metal chips can reach the interior of the battery housing, such that a risk of short-circuit is significantly reduced.

A further advantage of the battery housing according to the invention is that it has a minimized overall height, since the collars of the housing shells can have a low height extension.

Yet a further advantage of the battery housing according to the invention is that crash and/or crush loads are distributed in an improved manner in the event of an accident, such that the battery housing according to the invention offers increased safety in the event of an accident. This is because in the case of a load introduction in the event of twisting and/or bending of the battery housing, the flange region or the collar region of the battery housing is mechanically stabilized by means of the connection element.

Yet a further advantage of the battery housing according to the invention is that there are reduced stiffness demands on the flange region or on the collar region of the battery housing, since the stiffening takes place by means of the connection element. Thus, a reduced material use for the battery housing in the region of the collar thereof is possible, as a result of which the weight of the battery housing according to the invention is also reduced.

In the case of a connection element consisting of metal, there is furthermore the advantage that a continuous electromagnetic energization of the flange region or of the collar region of the battery housing is provided. Furthermore, in the case of a connection element consisting of metal, it is advantageous that the collar region of the battery housing has improved fire protection.

The interior of the battery housing can of course also be designed to accommodate more than one battery module, i.e., at least two or any number greater than two battery modules.

The first collar can also be referred to as a first projection or as a first connecting flange and the second collar can also be referred to as a second projection or as a second connecting flange.

The first housing shell and/or the second housing shell preferably consist of a plastics material. Further preferably, the plastics material is fiber-reinforced, glass fibers and/or carbon fibers being embedded in a plastics material matrix. The advantage of housing shells consisting of plastics material is their low weight, the housing shells having sufficient stiffness and strength. A further advantage of housing shells consisting of plastics material is that, during the machining of the housing shells, no metal chips result which can reach the interior of the battery housing, such that a risk of short-circuit of a traction battery is reduced. Suitable plastics materials for the first housing shell and/or the second housing shell are polyamide and/or polypropylene and/or polycarbonates and/or polyethylene or a mixture of these plastics materials.

The connection element can also be referred to as a retaining clamp and/or as a clamping rail. The connection element is preferably formed from a metal. Suitable metals for the connection element are, for example, steel and/or aluminum and/or copper and/or brass. The correspondingly designed connection element has the advantage that the second latching means can have a suitable plastic deformability, such that the second latching means is plastically deformable between a release position, in which the second latching means is not latched to the first latching means, and a latching position, in which the second latching means is latched to the first latching means. Consequently, the assembly of the battery housing is possible in a further simplified manner by a corresponding design of the connection element.

The connection element preferably has a U-shaped or V-shaped profile in cross section, the two pressure limbs of the connection element forming the limbs of the U-profile or of the V-profile. Further preferably, the two pressure limbs of the connection element are connected to one another by a rear wall, it also being possible for the rear wall to be referred to as a belt.

Latching is understood, according to the invention, to mean that the first latching means engages behind the second latching means, and/or that the second latching means engages behind the first latching means, such that the connection element is prevented from being pulled off from the two collars of the housing shells when the second latching means is in the latching position. Preferably, the first latching means and the second latching means are in contact with one another.

The battery housing is preferably designed such that the connection element is designed to engage behind the first collar and/or the second collar.

The correspondingly designed battery housing has the advantage that assembly of the battery housing is possible in a simplified manner. This is because the second latching means of the connection element can be preformed in such a way that the second latching means is located in its latching position, such that, during the assembly of the battery housing, when the connection element is pushed on the collars of the housing shells, the second latching means is elastically deformed and, after engaging behind the first latching means, returns to its latching position.

Alternatively, it is possible for the second latching means of the connection element to be preformed in such a way that it is in its release position, the second latching means being deformed, by crimping, into its latching position, after the connection element has been pushed onto the collar.

Further preferably, the battery housing is designed such that the first latching means is designed as a latching depression and/or as a latching edge and the second latching means is designed as a latching projection, it being possible for the at least one latching projection to engage behind the at least one latching depression and/or latching edge.

The correspondingly designed battery housing has a further simplified assembly. Furthermore, the structure of the correspondingly designed battery housing is particularly simple.

The second latching means of the connection element can also be referred to as a latching tongue.

Further preferably, the battery housing is designed such that the at least one latching projection is formed on at least one of the pressure limbs of the connection element.

The battery housing is preferably designed such that at least one latching projection is formed in each of the pressure limbs of the connection element.

The correspondingly designed battery housing has a simple structure, at the same time a reliable protection of a removal or detachment of the connection element from the collars of the housing shells being ensured.

Further preferably, the battery housing is designed such that at least one of the pressure limbs has at least one material recess in which the at least one latching projection is arranged.

The battery housing is preferably designed such that both pressure limbs of the connection element each have at least one material recess, in each of which a latching projection is arranged.

By means of a corresponding design of the battery housing, its assembly and its disassembly or opening is possible in a further simplified manner, since the latching projection can be transferred in a simplified manner into its latching position and the open position. Furthermore, due to the material recess, the latching projection is more easily accessible by means of a suitable tool. For example, a screwdriver can be used to transfer the latching projection from its latching position into its open position.

Further preferably, the battery housing is designed such that at least one disassembly opening is formed on one of the pressure limbs.

The correspondingly designed battery housing can be disassembled in a further improved manner and can thus be opened for maintenance work. This is because, by providing a disassembly opening, it is more easily possible to displace the connection element with respect to the collars of the housing shells, such that the first latching means and the second latching means can be disengaged.

The at least one disassembly opening is preferably arranged adjacently to the latching projection.

Further preferably, the at least one pressure limb has two disassembly openings, the latching projection being arranged between the two disassembly openings.

Further preferably, the battery housing is designed such that the at least one latching projection is plastically or elastically deformable, by means of crimping, into a latching position in which the latching projection engages behind the latching depression or latching edge.

The battery housing is preferably designed such that the first pressure limb and the second pressure limb are connected to one another by means of a rear wall, the first latching means being designed as a latching hook and the second latching means being designed as a latching opening in the rear wall, it being possible for the latching hook to be guided through the latching opening under elastic deformation of the latching hook by pushing the connection element onto the first and second collars, such that the latching hook engages behind the latching opening.

The correspondingly designed battery housing is particularly easy to assemble, since the connection element can be easily pushed onto the combined collars of the housing shells, the latching hook being guided through the latching opening under elastic deformation and engaging behind the latching opening, after the connection element has been pushed onto the collar under a restoring movement, such that the connection element cannot be pulled off the collar. In order to open the battery housing (for example for maintenance work and/or for the installation or removal of a battery module), the latching hook can be brought into disengagement from the latching opening under elastic deformation or, if appropriate, plastic deformation, and the connection element can be pulled off the collar.

The rear wall of the connection element can also be referred to as a belt.

The latching of the latching hook to the latching opening can also be referred to as clipping.

The battery housing is preferably designed such that the battery housing has at least one sealing element that is arranged between the first collar and the second collar.

By providing the sealing element, the battery housing has a further improved tightness. Preferably, the sealing element has an X-shaped or O-shaped or L-shaped cross section. According to the invention, there are no restrictions with regard to the design of the sealing element. This further improves the tightness of the battery housing.

Further preferably, the battery housing is designed such that the first collar and/or the second collar has a receiving groove in which the at least one sealing element is arranged.

The correspondingly designed battery housing has a further improved tightness since the sealing element has a fixed positioning between the first collar and the second collar. Furthermore, the sealing element can be compressed in a defined manner by a depth extension of the receiving groove when the housing shells are brought together, as a result of which the sealing effect of the sealing element is further improved.

The battery housing is preferably designed such that the first collar and/or the second collar has at least two projections between which the connection element can be positioned, such that a translational displacement of the connection element with respect to the housing shells is prevented.

The correspondingly designed battery housing has improved stability and tightness, since slippage of the connection element along the longitudinal extension of the collars is prevented.

The object of the present invention is also achieved by a traction battery having the features of claim 9. More precisely, the object of the present invention is achieved by a traction battery for a motor vehicle, the traction battery having a battery housing as described above, at least one battery module being accommodated in the interior of the battery housing.

Figure 1B:
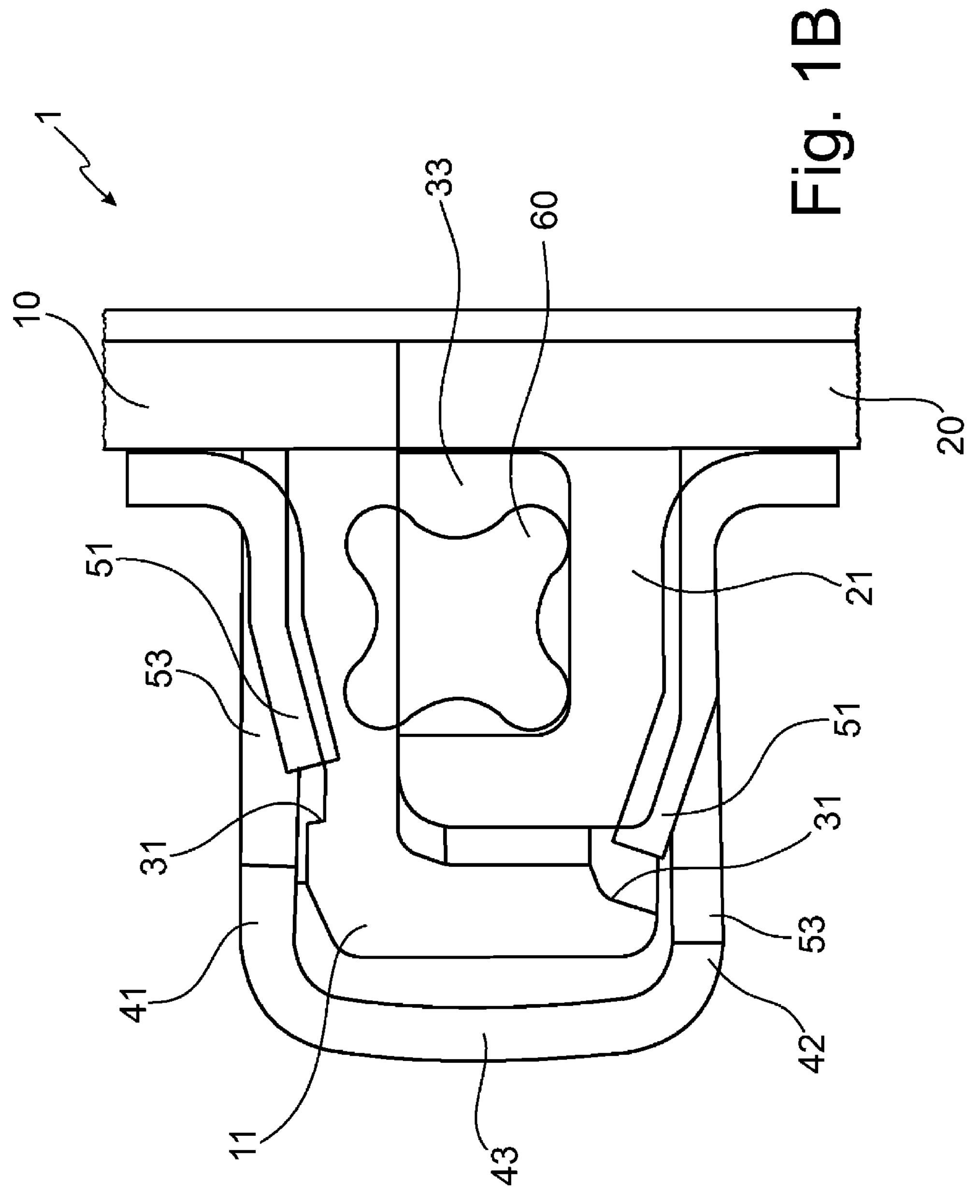
Figure 2:
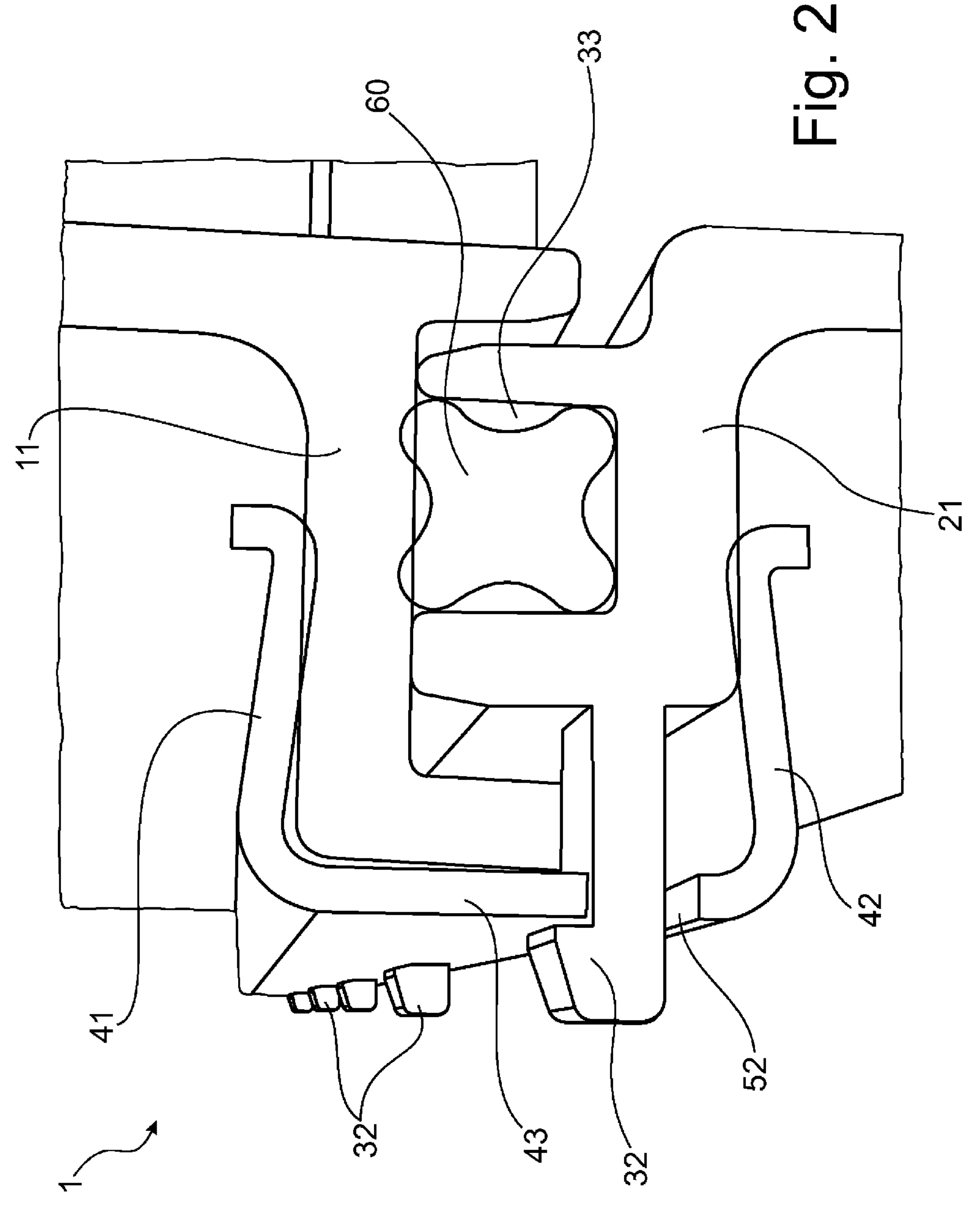
Figure 3:
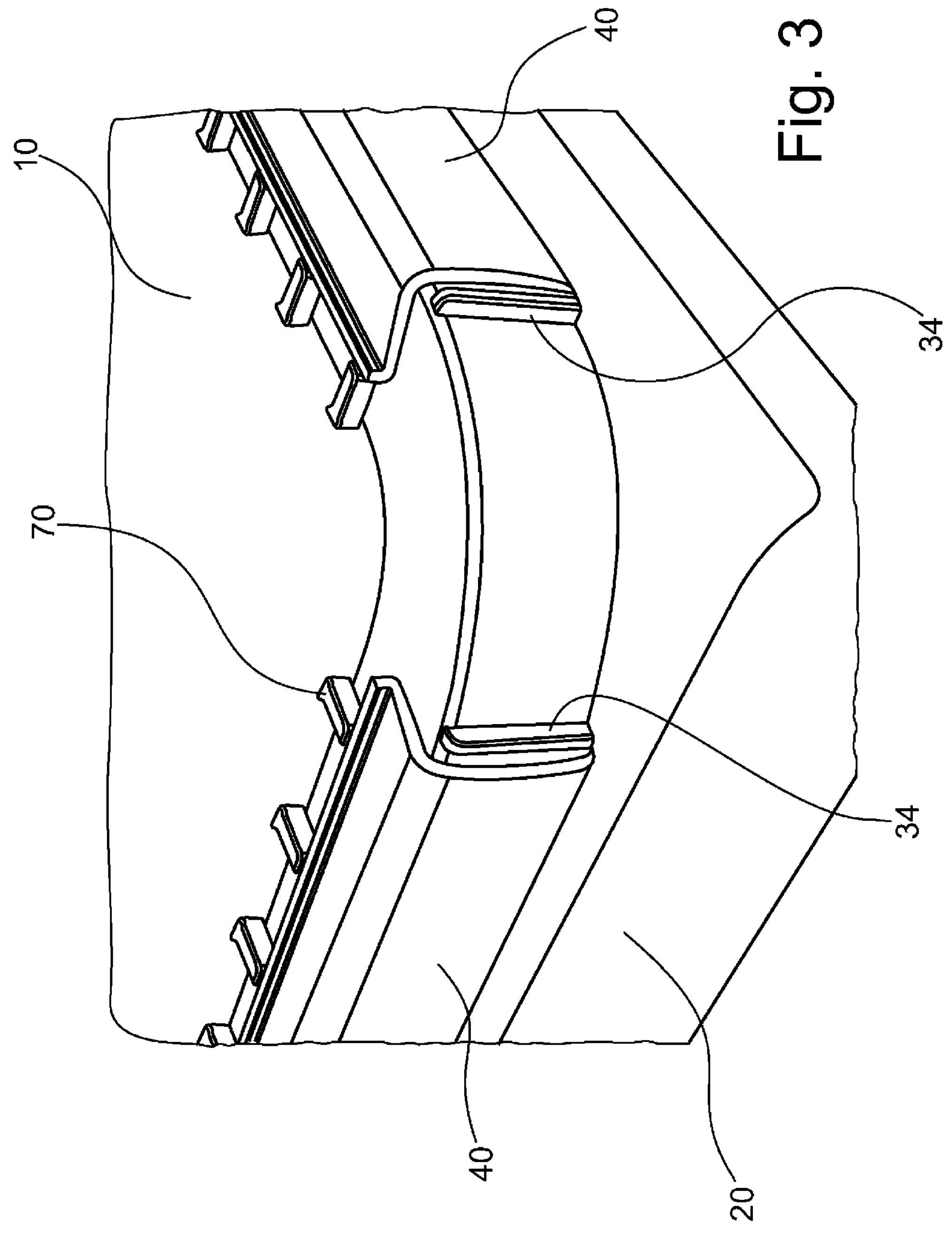
Figure 4A:
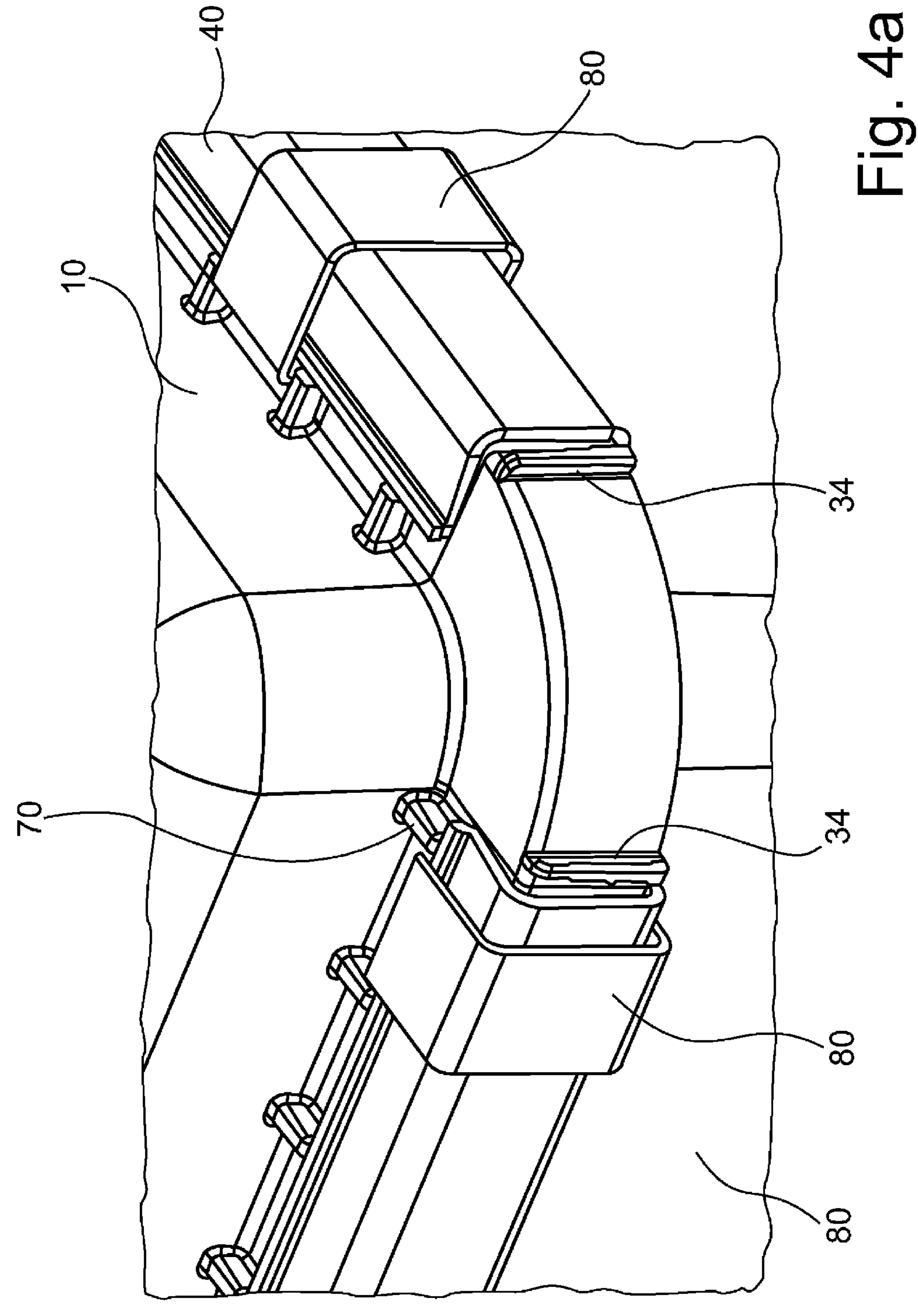
Figures 4B, 4C:
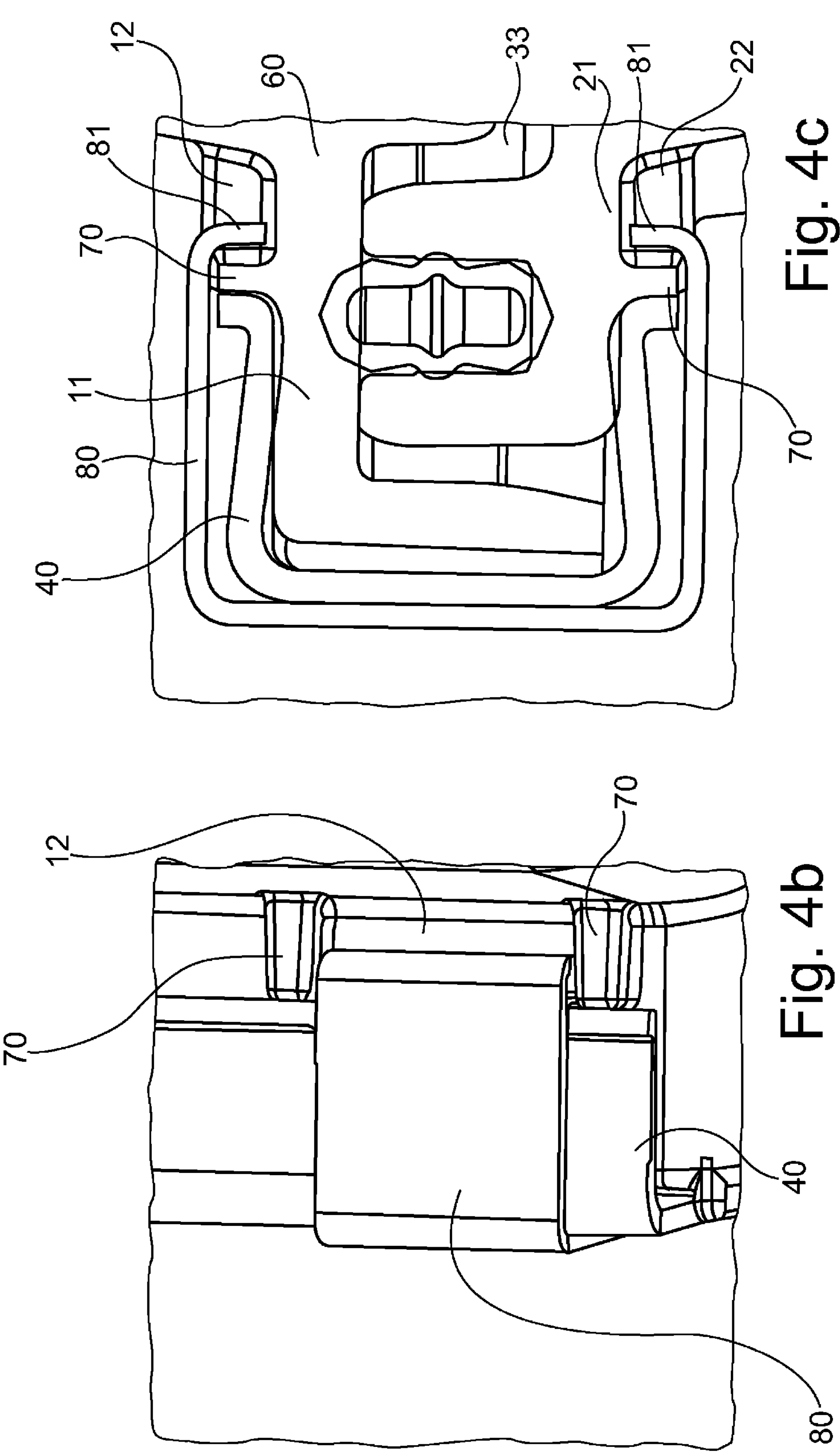

Further advantages, details and features of the invention can be found below in the described embodiments. In the drawings, in detail:

FIG. 1A: is a perspective view of a battery housing according to the invention in the contact region of a first housing shell with a second housing shell;

FIG. 1B: is a cross section of the cutout shown in FIG. 1A;

FIG. 2: is a perspective view of a battery housing according to a further embodiment of the present invention, in the contact region of a first housing shell with a second housing shell;

FIG. 3: is a perspective view of a corner region of a battery housing;

FIG. 4A: is a perspective view of a corner region of a battery housing according to a further embodiment of the present invention;

FIG. 4B: is a perspective plan view of a region of the battery housing shown in FIG. 4A; and FIG. 4C is a cross section of the cutout shown in FIG. 4B.

In the following description, the same reference signs denote the same components or features, such that a description of a component with reference to a drawing also applies to the other drawings. This avoids repeating the description. Furthermore, individual features that have been described in connection with one embodiment can also be used separately in other embodiments.

FIG. 1A is a perspective view of a battery housing 1 according to the invention in a contact region of a first housing shell 10 with a second housing shell 20. FIG. 1B is a cross section of the portion of the battery housing 1 shown in FIG. 1A.

The battery housing 1 is designed to receive a traction battery for an electrically drivable motor vehicle. The electrically drivable motor vehicle can be, for example, a purely electrically drivable motor vehicle or a hybrid motor vehicle, in which an internal combustion engine takes over the drive of the motor vehicle, together and/or alternately with an electric motor.

In a connected state of the first housing shell 10 with the second housing shell 20, the battery housing 1, thus formed, bounds an interior 2 which is designed to receive at least one battery module and preferably to receive a plurality of battery modules.

As can be seen from FIGS. 1A and 1B, the first housing shell 10 has a first collar 11 which extends at least partially around the first housing shell 10. It can be seen from the figures that the first collar 11 is L-shaped and extends away from the first housing shell 10 to the outside of the battery housing 1. The second housing shell 20 has a second collar 21 which extends at least partially around the second housing shell 20. The second collar 21 also extends away from the second housing shells 20, from the interior 2. In the embodiment shown, the second collar 21 is also L-shaped, with one of the limbs of the second collar 21 together with the housing wall of the second housing shell 20 forming a receiving groove 33 in which, in the embodiment shown, a sealing element 60 is arranged, the sealing element 60 having an X-shaped cross section. In this case, the sealing element 60 is arranged between the first collar 11 and the second collar 21 and is accommodated in the receiving groove 33, such that a defined compression of the sealing element 60 is achieved by bringing together or pushing together the first housing shell 10 and the second housing shell 20.

The battery housing 1 according to the invention has at least one connection element 40 that has two pressure limbs. In this case, a first pressure limb 41 is connected to a second pressure limb 42 via a common rear wall 43. The connection element 40 consequently has a U-shaped cross section. The connection element 40 can also be referred to as a connecting rail 40 or as a connecting flange 40.

As can be seen from the figures, the connection element 40 is designed to enclose the first collar 11 and the second collar 21 and to clamp these to one another by the two pressure limbs 41, 42 of the connection element 40 exerting a normal force on the first collar 11 and on the second collar 21. Consequently, the sealing element 60 is compressed by pushing the connection element 40 onto the combined collars 11, 21.

It can be seen from the figures that a first latching means 30, 31 in the form of a depression 31 is formed on an outer surface of the first collar 11, the depression 31 having a latching edge 31. The second collar 21 also has a first latching means 30, 31 which, in the embodiment shown, is also designed as a latching depression 31 having a latching edge 31.

In the embodiment shown, the connection element 40 in turn has second latching means 50, 51, the second latching means 51 being designed in the form of latching projections 51. The respective latching projections are formed on the pressure limbs 41, 42 of the connection element 40. More precisely, the first pressure limb 41 has at least one latching projection 51 and the second pressure limb 42 of the connection element 40 also has at least one latching projection 51. It can be seen that, in the assembled state of the battery housing 1 shown in FIGS. 1A and 1B, the connection element 40 can be latched to the first collar 11 and the second collar 21 by means of the latching depressions 31 and by means of the latching projections 51, such that the connection element 40 cannot be pulled off the two collars 11, 21. Consequently, the connection element 40 can be latched to the first collar 11 and to the second collar 21.

It is further apparent from the figures that both the first pressure limb 41 and the second pressure limb 42 have a plurality of material recesses and 53, in each of which a latching projection 51 is arranged. As a result of the corresponding design, deformation of the latching projection 51 is possible in a simplified manner.

The latching projections 51 are either preformed in such a way that they are in the latching positions shown in FIGS. 1A and 1B, or the latching projections 51 are deformed, by a plastic deformation or by crimping, into the position shown in FIGS. 1A and 1B, after the connection element 40 has been pushed onto the first collar 11 and second collar 22.

The connection element 40 is consequently designed to engage behind the first collar 11 and the second collar 21. However, it is also possible that the connection element 40 only engages behind the first collar 11 or the second collar 21.

It can be seen that the connection element 40 and the first collar 11 are spaced apart from one another such that water which has penetrated into an intermediate space between the connection element 40 and the first collar 11 can flow off through gaps, shown in the figures, on the bottom of the connection element 40, and can emerge from the connection element 40 again, out of the recesses 53.

It can also be seen from FIG. 1A that the connection element 40 has disassembly openings 54 at least on the first pressure limb 41. Corresponding disassembly openings 54 can also be formed on the second pressure limb 42. The respective material recesses 53 are each surrounded by two disassembly openings 54, such that the material recess 53 is arranged between two disassembly openings 54. The disassembly openings 54 are used to disassemble the battery housing 1. For this purpose, a suitable tool or a plurality of suitable tools (for example one or more screwdrivers) is inserted into the disassembly opening 54 or into a plurality of disassembly openings 54 and the connection element 40 is thus displaced relative to the first collar 11 and the second collar 21, such that the latching projection 51 emerges from the latching depression 31, such that the connection element 40 can subsequently be pulled off the first collar 11 and the second collar 21.

FIG. 2 is a perspective view of a battery housing 1 according to a further embodiment of the present invention, in the connection region between the first housing shells 10 and the second housing shells 20. In the embodiment shown in FIG. 2, too, the first pressure limb 41 is connected to the second pressure limb 42 by means of a rear wall 43, such that the connection element 40 shown in FIG. 2 also has a U-shaped cross section. In the embodiment shown in FIG. 2, the first latching means 30 is formed as a latching hook 32, and the second latching means 50, 52 is formed as a latching opening 52 in the rear wall 43 of the connection element 40. The latching hook 32 or the latching hooks 32 can be guided through the respective latching openings 52 under elastic deformation of the respective latching hooks 32 by pushing the connection element 40 onto the first and second collars 11, 21, such that the respective latching hooks 32 engage behind the respective latching openings 52.

By pressing down the respective latching hooks 32, the latching hooks 32 can be transferred into disengagement with the latching opening 52, such that the connection element 40 can subsequently be pulled off the first collar 11 and the second collar 21.

The remaining structure of the battery housing 1 shown in FIG. 2 corresponds to the structure of the embodiment shown in FIGS. 1A and 1B, such that reference is made to the description of FIGS. 1A and 1B with regard to the description of the battery housing 1 shown in FIG. 2. The battery housing 1 shown in FIG. 2, however, has no disassembly openings 54.

FIG. 3 is a three-dimensional view of a further embodiment of a battery housing 1. Here, only a corner region of the battery housing 1 is shown. It can be seen that the first collar 11 has two projections 34. A connection element 40 is located on each of these projections 34, such that the connection elements 40 cannot be displaced in translation with respect to the first collar 11. Preferably, the respective connection elements 40 are arranged between two projections 34, such that a displacement of the connection elements 40 in both directions along the longitudinal extension of the respective first collars 11 is prevented.

It can also be seen from FIG. 3 that the first housing shells 10 have a plurality of spacers 70 on which the respective connection elements 40 rest. This ensures a defined position of the respective connection elements relative 40 to the first collar 11 and thus also to the second collar 21. Furthermore, the spacers 70 are used as force introduction points for pushing together the first housing shell 10 and the second housing shell 20 when the battery housing is assembled.

The embodiment shown in FIG. 3 can be combined with the embodiment that is shown in FIGS. 1A and 1B. Furthermore, the embodiment shown in FIG. 3 can be combined with the embodiment shown in FIG. 2.

FIGS. 4A, 4B and 4C show a battery housing 1 according to a further embodiment of the present invention. The embodiment shown in FIGS. 4A, 4B and 4C is based on the embodiment shown in FIG. 3, such that reference is made to the above description with regard to the common features.

The battery housing 1 shown in FIGS. 4A, 4B and 4C differs from the battery housing 1 shown in FIG. 3 in that the battery housing 1 shown in FIGS. 4A, 4B and 4C has retaining clamps 80 by means of which a removal of the connection element 40 or the connection elements 40 from the first collar 11 and/or the second collar 21 is prevented. For this purpose, the retaining clamps 80, which are U-shaped in cross section, each have a latching device 81 on their free limbs. In the embodiment shown, the latching devices 80 are designed as latching strips 81, the present invention not being limited to a corresponding design of the latching devices 81.

The retaining clamps 80 each enclose a connection element 40, in each case a retaining strip 81 of the retaining clamp 80 engaging in a fastening groove 12 of the first collar 11, and a further retaining strip 81 of the retaining clamp 80 engaging in a fastening groove 22 of the second collar 21, such that the retaining clamp 80 cannot be pulled off the first collar 11 and the second collar 21 as long as the retaining strips 81 engage in the fastening grooves 12, 22.

It can be seen in particular from FIG. 4B that the fastening grooves 12, 22 are each formed between two spacers 70 on respective outer sides of the first collar 11 and of the second collar 21. Thus, the latching strips 81 are also arranged between two spacers 70 in each case, as a result of which a displacement of the retaining clamps 80 in both directions along the longitudinal extension of the respective first collars 11 and second collars 21 is prevented.

The embodiment shown in FIGS. 4A, 4B and 4C can be combined with the embodiment shown in FIGS. 1A and 1B. Furthermore, the embodiment shown in FIGS. 4A, 4B and 4C can be combined with the embodiment shown in FIG. 2.

LIST OF REFERENCE SIGNS

1 Battery housing
2 Interior (of the battery housing)
10 First housing shell
11 First collar
12 Fastening groove (in the first collar)
20 Second housing shell
21 Second collar
22 Fastening groove (in the second collar)
30 First latching means (of the first or second collar)
31 Latching depression/latching edge (of the first or second collar)
32 Latching hook (of the first or second collar)
33 Receiving groove
34 Projection
40 Connection element
41 First limb/pressure limb (of the connection element)
42 Second limb/pressure limb (of the connection element)
43 Rear wall (of the connection element)
50 Second latching means (of the connection element)
51 Latching projection (of the connection element)
52 Latching opening (of the connection element)
53 Material recess
54 Disassembly opening
60 Sealing element
70 Spacer
80 Retaining clamp
81 Latching device/latching strip/latching arm (of the retaining clamp)

The invention claimed is:

1. A battery housing for a traction battery, the battery housing comprising:
- a first housing shell;
- a second housing shell configured to connect to the first housing shell, for bounding an interior configured to receive at least one battery module;
- a first collar extending at least partially around the first housing shell;
- a second collar extending at least partially around the second housing shell;
- at least one sealing element arranged between the first collar and the second collar, the first collar and/or the second collar having a receiving groove in which the at least one sealing element is disposed; and
- at least one connection element having two pressure limbs, the at least one connection element being configured to enclose the first collar and the second collar and to clamp the first collar to the second collar via the two pressure limbs of the at least one connection element exerting a normal force on the first collar and on the second collar, wherein:
- the first collar and/or the second collar has at least one first latch,
- the first collar and/or the second collar has at least two projections, between which the at least one connection element is positionable, such that a translational displacement of the at least one connection element in a linear direction is prevented,
- the at least one connection element has at least one second latch, and
- the at least one connection element is configured to connect to the first collar and/or the second collar via the at least one first latch and the at least one second latch.

2. The battery housing according to claim 1, wherein the at least one connection element is configured to engage behind the first collar and/or the second collar.

3. The battery housing according to claim 2, wherein:
- the at least one first latch is at least one of a latching depression or a latching edge, and
- the at least one second latch is a latching projection configured to engage behind the at least one of the latching depression or the latching edge.

4. The battery housing according to claim 3, wherein the latching projection is formed on at least one of the two pressure limbs of the at least one connection element.

5. The battery housing according to claim 4, wherein at least one of the two pressure limbs has at least one material recess in which the latching projection is arranged.

6. The battery housing according to claim 4, wherein at least one disassembly opening is formed on one of the two pressure limbs.

7. The battery housing according claim 3, wherein the latching projection is plastically or elastically deformable, via crimping the latching projection, into a latching position in which the latching projection engages behind the at least one of the latching depression or the latching edge.

8. The battery housing according to claim 1, wherein:
- the two pressure limbs include a first pressure limb and a second pressure limb,
- the first pressure limb and the second pressure limb are interconnected via a rear wall,
- the at least one first latch is configured as a latching hook,
- the at least one second latch is configured as a latching opening in the rear wall, and the latching hook is guidable through the latching opening under elastic deformation of the latching hook by pushing the at least one connection element onto the first collar and the second collar, such that the latching hook engages behind the latching opening.

9. The battery housing according to claim 1, further comprising the traction battery for a motor vehicle, the traction battery accommodated in the interior of the battery housing.

* * * * *